US008618416B2

(12) United States Patent
Rothbaurer et al.

(10) Patent No.: US 8,618,416 B2
(45) Date of Patent: Dec. 31, 2013

(54) WATER TIGHT OUTLET COVER

(76) Inventors: Daniel A. Rothbaurer, Elkhart, IN (US); Brian E. Rothbauer, Elkhart, IN (US)

( * ) Notice: Subject to any disclaimer, the term of this patent is extended or adjusted under 35 U.S.C. 154(b) by 112 days.

(21) Appl. No.: 13/431,338

(22) Filed: Mar. 27, 2012

(65) Prior Publication Data

US 2013/0255990 A1 Oct. 3, 2013

(51) Int. Cl.
*H02G 3/14* (2006.01)

(52) U.S. Cl.
USPC ................ 174/67; 174/66; 220/241; 439/135

(58) Field of Classification Search
USPC ............... 174/66, 67; 220/241, 242; 439/135, 439/136, 145
See application file for complete search history.

(56) References Cited

U.S. PATENT DOCUMENTS

| | | | | |
|---|---|---|---|---|
| 4,801,271 | A * | 1/1989 | Piper | 439/148 |
| 5,198,618 | A * | 3/1993 | Shieh | 174/67 |
| 6,364,673 | B1 * | 4/2002 | Lee | 439/139 |
| 7,094,969 | B1 * | 8/2006 | In | 174/66 |
| 7,541,541 | B1 * | 6/2009 | Baldwin et al. | 174/67 |
| 8,445,781 | B1 * | 5/2013 | Chasser | 174/67 |

* cited by examiner

*Primary Examiner* — Dhirubhai R Patel
(74) *Attorney, Agent, or Firm* — Botkin & Hull, LLP

(57) ABSTRACT

The present invention is an outlet cover that is useful for covering a cylindrical socket type outlet. The outlet cover provides a watertight cover that is useful in marine applications and may be useful in automotive applications as well. The outlet cover has a base that has a flange. An upstanding ring extends upwardly from the base and an annular notch that has a diameter smaller than the outer diameter of the upstanding ring. A cap has a tether that joins the base to the cap. An annular rib in the cap is adapted for mating with the annular notch on the base. The annular rib includes a notch partially through it and is adapted for accommodating the tether when the annular rib is mated with the notch on the base.

4 Claims, 4 Drawing Sheets

WATER TIGHT OUTLET COVER

BACKGROUND OF THE INVENTION

Cylindrical socket style outlets are common in automotive and marine use and are formed from what used to be used to hold burner type cigarette lighters in vehicles. Since the introduction of the socket outlet, accessories that plug into the cylindrical socket have become very popular. As such, the use of the socket style outlet is prolific. When these outlets are not used to hold a lighter, they remain open and susceptible to being contaminated by items falling in, or having liquids get into the outlet. This is particularly a problem in marine use as water could readily short out the outlet. A cover is needed when an accessory is not plugged into the outlet and ideally this cover should be waterproof. The cover should be something that will remain attached to the outlet, but easily removed when it is time to use the outlet.

SUMMARY OF THE INVENTION

The present invention is an outlet cover that is useful for covering a cylindrical socket type outlet. The outlet cover provides a watertight cover that is useful in marine applications and may be useful in automotive applications as well. The outlet cover has a base that has a flange. The flange has a bottom surface and an upper surface that is joined to an upstanding ring extending above the upper surface of the flange on the base. The upstanding ring has an inner diameter and an outer diameter. The upstanding ring includes an annular notch that has a diameter smaller than the outer diameter of the upstanding ring. The outlet cover also has a cap that has an outer ring and a plug. The outer ring terminates in a rim surface. The outer ring has an inner diameter and an annular rib that extends radially inward of the inner diameter. The outer ring is spanned by a center disc that is attached to the outer ring. The plug extends from the center disc. The plug has an outer diameter that is adapted for fitting within the cylindrical socket. The cap has a tether that joins the base to the cap. The annular rib in the cap is adapted for mating with the annular notch on the base. The annular rib includes a notch partially through it and is adapted for accommodating the tether when the annular rib is mated with the notch on the base.

DETAILED DESCRIPTION OF INVENTION

Figure 1:
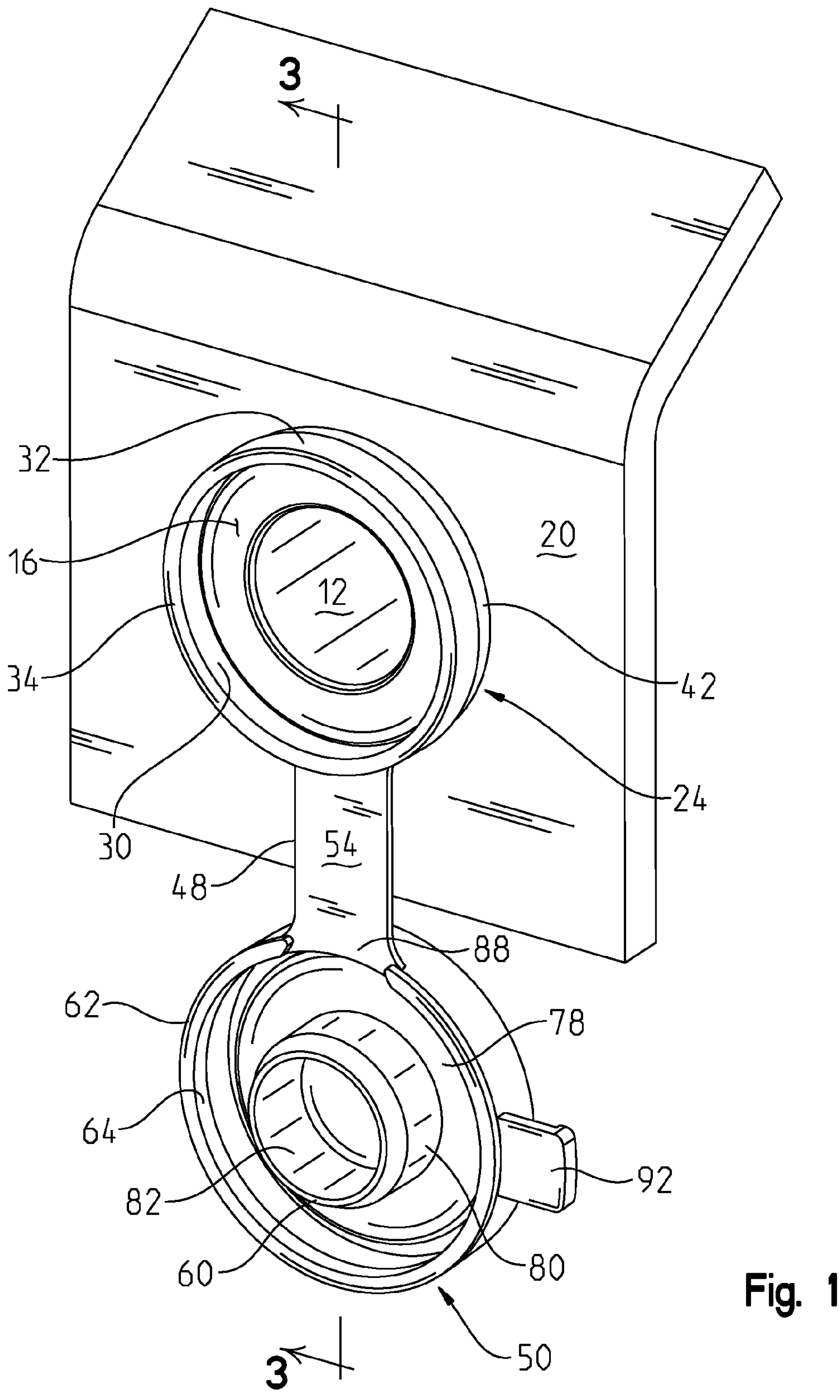
FIG. 1 is a perspective view of the outlet cover opened and installed in a panel.
Figure 2:
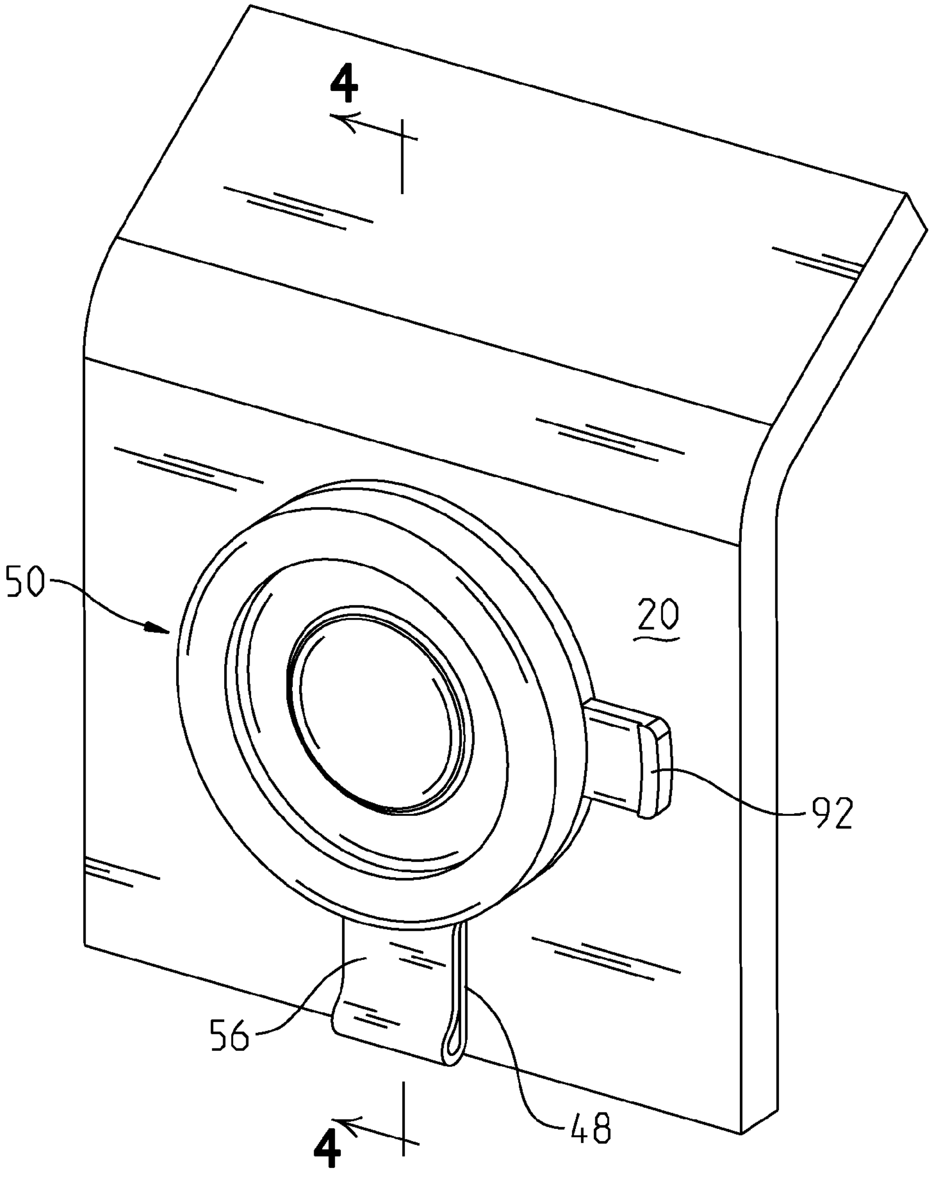
FIG. 2 is a perspective view of the outlet cover inserted in the socket outlet shown in FIG. 1.
Figure 3:
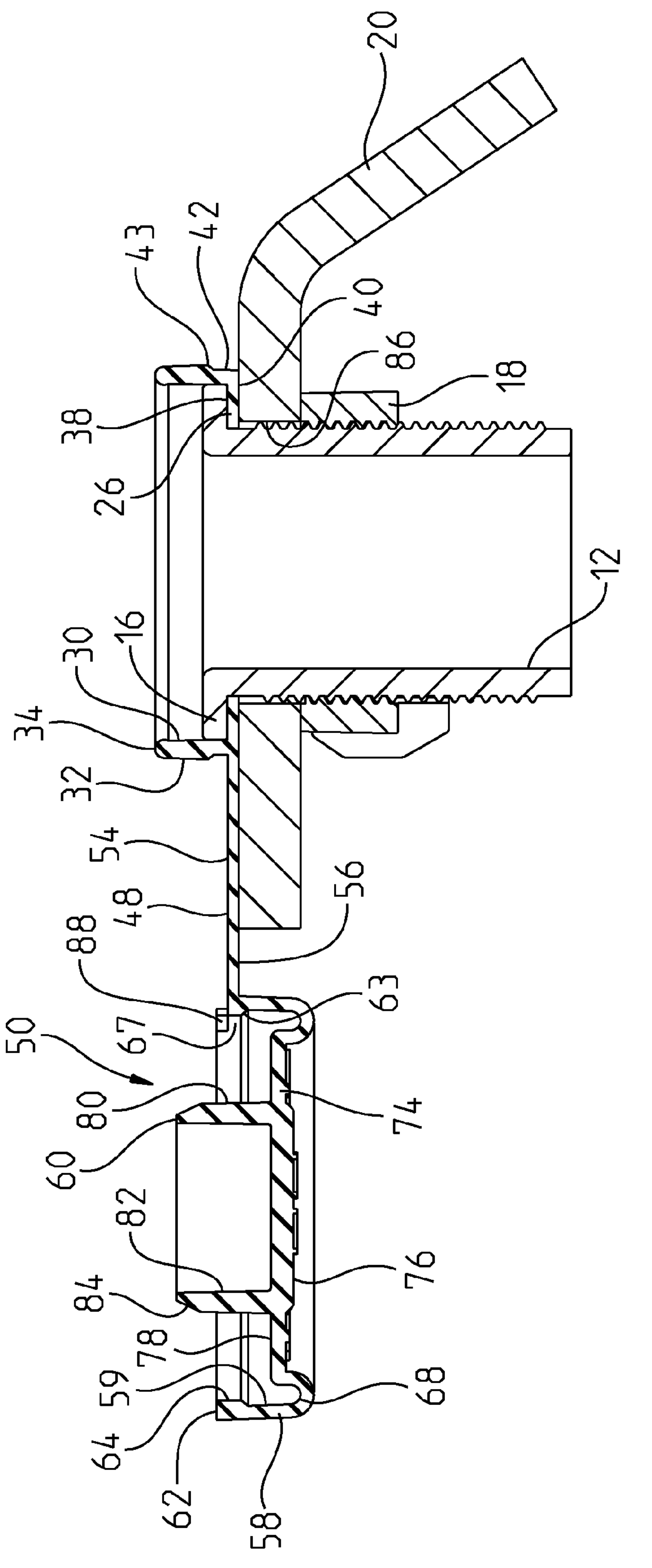
FIG. 3 is a sectional view taken about line 3-3 in FIG. 1.

The present invention is an outlet cover 10 that is meant to seal out water from entering into an outlet socket 12. The outlet socket 12 is typical of those found in automotive and marine applications. The socket 12 is a metal part that is designed to conduct electricity to an appliance that is to be plugged into the socket 12. The socket 12 acts as an electrical terminal and the socket 12 also has another terminal at its bottom that is not shown, but is familiar to those skilled in the art. The socket 12 has a retention flange 16 on one side and a nut 18 that is on the opposite. The socket 12 as shown in FIGS. 1-4 is shown installed in a segment of a panel 20, which may be a dash panel or console panel in a vehicle. FIG. 3 is a sectional view that shows the flange 16 and nut 18 straddling panel 20 to hold the socket 12 in place.

The outlet cover 10 has a base 24 that is adjacent to the panel 20. The base 24 has a base flange 26 that is perpendicular to an upstanding ring 28. The upstanding ring 28 has an inner diameter 30, an outer diameter 32 and an upper end 34. The base flange 26 extends radially inward with respect to the upstanding ring 28. The base flange 26 has an upper surface 38 and a bottom surface 40. The upstanding ring 28 has an annular notch 42 extending completely around the outside of the upstanding ring 28. The annular notch 42 extends away from the bottom surface 40 of the base flange 26 for a predetermined height to a top 43 of the notch 42.

The annular notch 42 has a tether 48 that extends from the annular notch 42. The tether 48 is thinner than the predetermined height of the annular notch 42 and does not extend up to the top 43 of the annular notch 42, as can be seen in FIG. 3. The tether 48 is designed to connect a cap 50 to the base 24. The tether 48 is made of the same type of resilient material that the base 24 and cap 50 are made from, which is typically a water proof elstomeric material. The tether 48 has an upper surface 54 and a lower surface 56 that define its thickness. The tether 48 is positioned so that the lower surface 56 of the tether 48 is aligned with the bottom surface 40 of the base flange 26.

Figure 4:
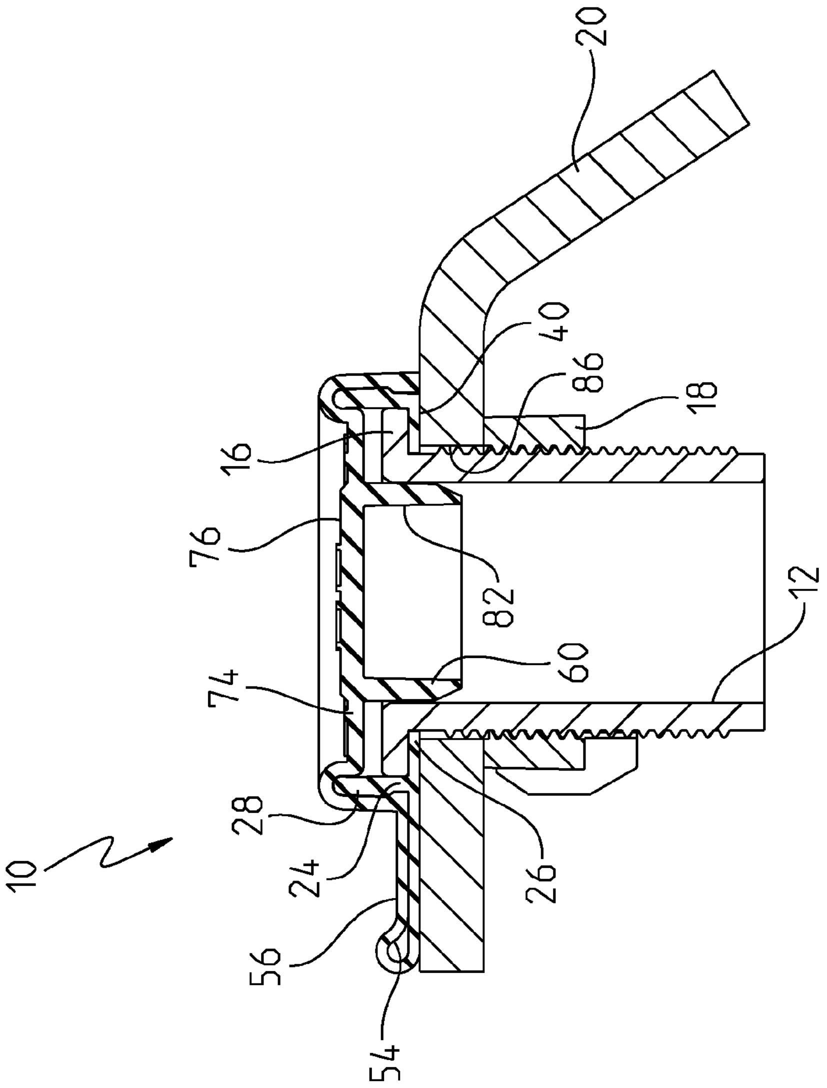
FIG. 4 is a sectional view taken about line 4-4 in FIG. 2.

The cap 50 is designed to be complementary to the base 24 when snap fitted over the base 24 as shown in FIG. 4. The cap 50 has an outer ring 58 and a plug 60 located within the outer ring 58. The outer ring 58 has an inner diameter 59 and the outer ring 58 terminates in a rim surface 62. The outer ring 58 includes an annular rib 64 that extends radially inward of the inner diameter 59 of the outer ring 58. The annular rib 64 terminates at the rim surface 62 on one end and extends for a predetermined height within outer ring 58 to a top 63 of the annular rib 64 located within the outer ring 58 spaced from the rim surface 62. The predetermined height of the annular rib 64 is designed to be the same as that of the annular notch 42 so that the annular rib 64 and annular notch 42 form a complementary fit when the cap 50 is pushed onto the base 24 as shown in FIG. 4. The outer ring 58 extends until its inner apex 68, which is the farthest point from the rim surface 62 on the inside of the cap 50. The outer ring 58 continues around to and is continuously joined to a center disc 74 that supports plug 60. The center disc 74 has an outer surface 76 and an inner surface 78 from which plug 60 extends. The plug 60 has an outer diameter 80 and an inner 82 diameter. The outer diameter 80 includes a chamfer 84. The rim surface 62 is notched at notch 88, which extends to surface 54 of the tether 48. As can be seen in FIG. 3, notch 88 does not extend all of the way through annular rib 64. This leaves a portion 67 of the annular rib 64 between the top 63 of the annular rib 64 and notch 88. Portion 67 undercuts outer diameter 32 adjacent to tether 48 so the area immediately above the tether 48 is sealed by the mating of annular rib 64 and annular notch 42. FIG. 4 shows this sealed relationship.

Installation of the outlet cover 10 is done by first putting the base 24 on the panel 20 surrounding a hole 86 through which the socket 12 is inserted. Once the socket 12 is inserted into the hole 86 in the panel 20, the nut 18 is tightened. This clamps the base flange 26 between the panel 20 and the flange 16 on the socket 12 so that it is captured between the panel 20 and flange 16.

When using the outlet cover 10, a user will take the cap 50 and push it onto the base 24. When this is done, the cover 10 will be in the configuration shown in FIG. 4. The cap 50 is designed so that the inner diameter 59 of the cap fits over the outer diameter 32 of the base 24 in a complementary fashion.

The annular rib 64 fits within the annular notch 42 in a complementary fashion. It should be noted that annular rib 64 completely encircles the annular notch 42 because the annular rib is continuous around the entire cap 50, and although partially reduced at notch 88, the annular rib 64 complements the annular notch 42 adjacent to the tether at portion 67 of the annular rib 64. The rim surface 62 of the cap 50 is aligned with bottom surface 40 on the base 24 when the annular rib 64 is seated in annular notch 42. Upper end 34 is seated complementarily within the apex 68. Surface 54 of the tether 48 is folded so that it touches itself as shown in FIG. 4. Due to the complementary nature of the fit between the cap 50 and base 24, water is prevented from entering the socket 12 due to the circuitous path created, in addition to the watertight fit of the annular rib 64 within the annular notch 42. The plug 60 is adapted for fitting within the socket 12, which assists in retention of the cap 50 in the position shown in FIG. 4.

When a user wishes to remove the cap 50 from the base 24, he will pull tab 92 that extends from the side of the cap 50 with enough force to dislodge the cap 50 from the base 24.

The invention is not limited to the details given above, but may be modified within the scope of the following claims.

What is claimed is:

1. An outlet cover for an outlet having a cylindrical socket with a retention flange, said cover comprising:

a base having a base flange including a bottom surface and an upper surface joined to an upstanding ring extending above said upper surface, said upstanding ring having an inner diameter and an outer diameter, said upstanding ring including an annular notch having a diameter smaller than said outer diameter, a cap having an outer ring and a plug, said outer ring terminating in a rim surface of said cap and said outer ring having an inner diameter and an annular rib extending radially inward of said inner diameter and terminating at a top spaced from and opposite said rim surface, said outer ring being spanned by a center disc attached to said outer ring, said center disc supporting said plug and said plug extending from said center disc, said plug having an outer diameter of said plug adapted for fitting within said cylindrical socket, said cap having a resilient tether joining said base to said cap, said annular rib on said cap adapted for mating with said annular notch on said base for an interlocking fit, said annular rib on said cap including a notch partially through said annular rib, said notch in said annular rib on said cap extending from said rim surface toward said top of said annular rib, said tether fitting within said notch in said cap when said annular rib is mated with said notch on said base.

2. The outlet cover of claim 1, wherein said annular rib has a height greater than a thickness of said tether.

3. The outlet cover of claim 1, wherein said annular rib terminates at said rim surface, and said rim surface being substantially aligned with said bottom surface of said base flange when said annular rib is in said annular notch on said base.

4. The outlet cover of claim 3, wherein said outer diameter of said upstanding ring of said base contacts said inner diameter of said outer ring when said annular rib is interlocked into seated in said annular notch.

* * * * *